(12) United States Patent
Paczkowski et al.

(10) Patent No.: US 11,039,359 B1
(45) Date of Patent: Jun. 15, 2021

(54) WIRELESS COMMUNICATION DEVICE HANDOVERS BETWEEN WIRELESS COMMUNICATION NETWORK SLICES

(71) Applicant: T-MOBILE INNOVATIONS LLC, Overland Park, KS (US)

(72) Inventors: Lyle Walter Paczkowski, Mission Hills, KS (US); Tracy Lee Nelson, Overland Park, KS (US); Mark Richard Bales, Lee's Summit, MO (US); Serge M. Manning, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/688,029

(22) Filed: Nov. 19, 2019

(51) Int. Cl.
*H04W 36/12* (2009.01)
*H04W 36/00* (2009.01)

(52) U.S. Cl.
CPC ....... *H04W 36/12* (2013.01); *H04W 36/0038* (2013.01); *H04W 36/0044* (2013.01)

(58) Field of Classification Search
USPC ........................................................ 370/331
See application file for complete search history.

(56) References Cited

U.S. PATENT DOCUMENTS

| | | | |
|---|---|---|---|
| 9,509,587 B1 * | 11/2016 | Marquardt | H04L 45/38 |
| 9,775,045 B2 | 9/2017 | Li et al. | |
| 10,321,371 B2 | 6/2019 | Zhang et al. | |
| 10,361,843 B1 * | 7/2019 | Suthar | H04L 9/3247 |
| 10,623,257 B1 * | 4/2020 | Marquardt | H04W 16/18 |
| 2016/0353465 A1 | 12/2016 | Vrzic et al. | |
| 2017/0086118 A1 | 3/2017 | Vrzic | |

(Continued)

FOREIGN PATENT DOCUMENTS

| | | |
|---|---|---|
| CN | 107113195 A | 8/2017 |
| WO | 2016192636 A1 | 12/2016 |

(Continued)

OTHER PUBLICATIONS

Backman, Jere, et al. "Blockchain network slice broker in 5G: Slice leasing in factory of the future use case." 2017 Internet of Things Business Models, Users, and Networks. IEEE, 2017. (Year: 2017).*

(Continued)

*Primary Examiner* — Nathan S Taylor (57) ABSTRACT

A wireless network control system facilitates a handover of User Equipment (UE) from a source network slice to a target network slice. The source slice delivers an internet-access service to the UE using a Quality-of-Service level and access restrictions. The UE detects a handover trigger and exchanges handover signaling with the source network slice. A hardware-trust controller verifies a hardware identification code embedded in the UE responsive to the handover signaling. A distributed ledger generates a slice template to implement the QoS and access restrictions for the UE in the target network slice in response to the handover signaling and the hardware-trust verification. The signaling circuitry transfers the slice template to the target slice. The target slice delivers internet-access service to the UE using the QoS and the restrictions in response to the slice template.

20 Claims, 8 Drawing Sheets

(56) References Cited

U.S. PATENT DOCUMENTS

| | | | |
|---|---|---|---|
| 2017/0118200 A1* | 4/2017 | Leggette | H04L 63/101 |
| 2017/0164349 A1 | 6/2017 | Zhu et al. | |
| 2017/0332421 A1 | 11/2017 | Sternberg et al. | |
| 2018/0139042 A1* | 5/2018 | Binning | H04L 9/3297 |
| 2018/0242304 A1 | 8/2018 | Rong et al. | |
| 2018/0376384 A1 | 12/2018 | Youn et al. | |
| 2019/0058997 A1 | 2/2019 | Futaki et al. | |
| 2020/0007513 A1* | 1/2020 | Gleichauf | H04L 63/00 |
| 2020/0195495 A1* | 6/2020 | Parker | H04W 48/18 |
| 2020/0364187 A1* | 11/2020 | Tran | H04B 7/0413 |
| 2020/0367129 A1* | 11/2020 | Raheem | H04L 41/0896 |

FOREIGN PATENT DOCUMENTS

| | | |
|---|---|---|
| WO | 2017074486 A1 | 5/2017 |
| WO | 2017098442 A1 | 6/2017 |
| WO | 2017144096 A1 | 8/2017 |
| WO | 2017168205 A1 | 10/2017 |
| WO | 2017171598 A1 | 10/2017 |
| WO | 2017197273 A1 | 11/2017 |
| WO | 2017200978 A1 | 11/2017 |
| WO | 2018028342 A1 | 2/2018 |
| WO | 2018083664 A1 | 5/2018 |
| WO | 2018084593 A1 | 5/2018 |

OTHER PUBLICATIONS

Ortega, Victor, Faiza Bouchmal, and Jose F. Monserrat. "Trusted 5G vehicular networks: Blockchains and content-centric networking." IEEE Vehicular Technology Magazine 13.2 (2018): 121-127. (Year: 2018).*

* cited by examiner

WIRELESS COMMUNICATION DEVICE HANDOVERS BETWEEN WIRELESS COMMUNICATION NETWORK SLICES

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless protocols transport network signaling and user data between the wireless user devices and the wireless access nodes. The wireless access nodes exchange corresponding network signaling and user data with wireless network cores. An exemplary wireless network core comprises a Network Function Virtualization Infrastructure (NFVI) that executes Virtual Network Functions (VNFs). The VNFs include network controllers and data gateways. In the NFVIs, different sets of VNFs are referred to as network slices. The VNFs and slices have various operating parameters and interfaces. As the wireless user devices move around, the wireless access nodes handover the user devices among one another. In addition, user device mobility causes the NFVIs to handover the wireless user devices among one another. Thus, the wireless network slices handover the wireless user devices between each other as well.

Hardware-trust entails the verification of physical hardware. Typically, a secret hardware-trust ID is permanently embedded in hardware circuitry. The hardware-trust circuitry hashes a random number with the secret hardware-trust ID to generate a hash result. A remote verification system that also has the secret hardware-trust ID hashes the same random number with its own version of the secret hardware-trust ID to generate a hash result. Hardware-trust is established when the hash results match.

Distributed ledgers are used to handle transactional data like account balances by using a blockchain format. A distributed ledger has multiple geographically-diverse computer nodes that each have a copy of chain code and data blocks. The computer nodes execute the chain code to test and build consensus on the results of chain code execution. For example, multiple computer nodes each execute chain code to determine a user's new balance after a debit and then build a consensus on the new balance before proceeding. Once a consensus is reached, then the computer nodes each store a new data block in their own blockchain database. The data block indicates chain code results and has a hash of the previous data block. The redundancy, consensus, and hashes make the distributed ledger highly reliable, secure, and visible.

Unfortunately, wireless communications networks do not handover UEs between wireless network slices in an efficient and effective manner. Moreover, wireless communications networks do not efficiently and effectively implement hardware-trust, internet QoS, or internet restrictions across wireless communication network boundaries.

TECHNICAL BACKGROUND

A wireless network control system facilitates a handover of User Equipment (UE) from a source network slice to a target network slice. The source slice delivers an internet-access service to the UE using a Quality-of-Service level and access restrictions. The UE detects a handover trigger and exchanges handover signaling with the source network slice. A hardware-trust controller verifies a hardware identification code embedded in the UE responsive to the handover signaling. A distributed ledger generates a slice template to implement the QoS and access restrictions for the UE in the target network slice in response to the handover signaling and the hardware-trust verification. The signaling circuitry transfers the slice template to the target slice. The target slice delivers internet-access service to the UE using the QoS and the restrictions in response to the slice template.

DETAILED DESCRIPTION

Figure 1:
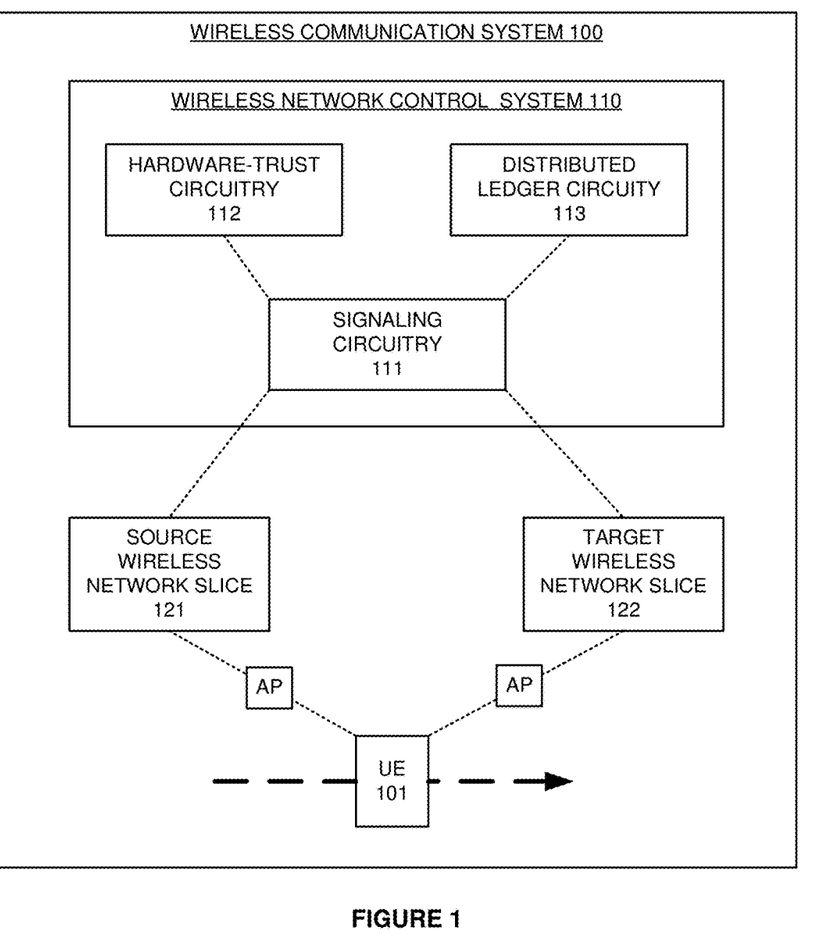
FIG. 1 illustrates a wireless communication system comprising a wireless network control system to facilitate a handover of wireless User Equipment (UE) from a source wireless network slice to a target wireless network slice.

FIG. 1 illustrates wireless communication system 100 comprising wireless network control system 110 to facilitate a handover of wireless User Equipment (UE) 101 from source wireless network slice 121 to target wireless network slice 122. Wireless communication system 100 comprises wireless network control system 110, source wireless network slice 121, and target wireless network slice 122. UE 101 might be a phone, computer, robot, vehicle, or some other mobile data appliance with wireless communication circuitry. UE 101 has a permanently embedded, read-only, hardware-identification code. Wireless network control system 110 comprises signaling circuitry 111, hardware-trust circuitry 112, and distributed ledger circuitry 113. Signaling circuitry 111 is linked to hardware-trust circuitry 112, distributed ledger circuitry 113, and wireless network slices 121-122.

Wireless UE 104 is wirelessly linked to a source Access Point (AP) that is connected to source wireless network slice 121. Wireless UE 104 hands-over from the source access point and source wireless network slice 121 to a target AP and target wireless network slice 122. In some examples, wireless UE 104 may use the same AP and handover from wireless network slice 121 to slice 122. The wireless links may use Fifth Generation New Radio (5GNR), Institute of Electrical and Electronic Engineers (IEEE) 802.11 (WIFI), Long Term Evolution (LTE), Low-Power Wide Area Network (LP-WAN), or some other wireless communication protocol. The wireless links may use frequencies in the low-band, mid-band, high-band, or some other part of the electromagnetic spectrum. The links that interconnect circuitry 111-113 and wireless network slices 121-122 may use IEEE 802.3 (Ethernet), Time Division Multiplex (TDM), Data Over Cable System Interface Specification (DOCSIS), Internet Protocol (IP), 5GNR, WIFI, LTE, or some other data communication protocol.

Wireless network control system 110 comprises microprocessors, memory, software, transceivers, and bus circuitry. The microprocessors comprise Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems and network applications. The network applications include signaling interfaces, hardware-trust modules, and distributed ledger nodes.

Wireless network slices 121-122 comprise microprocessors, memory, software, transceivers, and bus circuitry. The microprocessors comprise CPUs, GPUs, ASICs, and/or the like. The memories comprise RAM, flash circuitry, disk drives, and/or the like. The memories store software like operating systems, virtual layers, and network applications. The network applications include access functions, mobility functions, session functions, user-plane functions, and the like. In some examples, source wireless network slice is 121 in a home network for wireless UE 101, and target wireless network slice 122 is in a visited network for wireless UE 101.

Initially, source wireless network slice 111 delivers a wireless internet-access service to the wireless UE 101 using an internet-access Quality-of-Service (QoS) level and an internet-access restriction. The QoS level specifies bit-rate, latency, packet-marking, or some other quality parameters. The access restriction level specifies content filter-criteria, geo-time boundary, hardware-trust requirements, or some other user parameters. Wireless UE 101 detects a handover trigger like low signal strength, user application, time-of-day, geographic location, or some other metric.

In some examples, wireless UE 101 exchanges handover signaling with source wireless network slice 121, and slice 121 exchanges handover signaling with hardware-trust circuitry 112 over signaling circuitry 111. The handover signaling indicates information like network ID, slice ID, UE ID, UE hardware-trust status, UE type, and typically other information. In response to the handover signaling, wireless UE 101 exchanges hardware-trust data with hardware-trust circuitry 112 over wireless network slice 121 and signaling circuitry 111. Hardware-trust circuitry 112 verifies the hardware identification code embedded in UE 101 and returns a hardware-trust digital certificate to UE 101. If hardware-trust is verified for UE 101, then hardware-trust circuitry 112 exchanges handover signaling with distributed ledger circuitry 113. Responsive to the handover signaling, distributed ledger circuitry 113 generates a slice template to implement the internet-access QoS level and the internet-access restriction for UE 101 in target wireless network slice 122. For example, source wireless network slice 121 may use a source slice Identifier (ID) to serve UE 101 that is indicated by the handover signaling, and ledger 113 may generate the slice template by translating the source slice ID into a target slice ID that is pre-associated with a slice template for target wireless network slice 122. The template may have hardware-trust requirements and QoS packet-marking instructions. Distributed ledger circuitry 113 transfers the slice template to signaling circuitry 111 and records handover metadata in a blockchain format. Signaling circuitry 111 transfers the slice template to target wireless network slice 112. Signaling circuitry 111 exchanges handover signaling with source wireless network slice 121 to confirm the handover. Source wireless network slice 121 exchanges handover signaling with target wireless network slice 122 to initiate the handover. Source wireless network slice 121 exchanges handover signaling with UE 101 to initiate the handover. UE 101 exchanges handover signaling with target wireless network slice 122 to perform the handover. After the handover, UE 101 marks data packets for wireless network slice 122 per the handover signaling and slice template. UE 101 transfers its hardware-trust certificate to target wireless network slice 122. Target wireless network slice 122 verifies the hardware-trust certificate for UE 101. If the hardware-trust certificate is verified, then target wireless network slice 122 delivers the wireless internet-access service to wireless UE 101 using the internet-access QoS level and the internet-access restrictions indicated by the slice template.

In other examples, wireless UE 101 exchanges handover signaling with source wireless network slice 121, and slice 121 exchanges handover signaling with target wireless network slice 122 to initiate the handover. Source wireless network slice 121 exchanges handover signaling with UE 101 to initiate the handover. UE 101 exchanges handover signaling with target wireless network slice 122 to perform the handover. In response to the handover signaling, wireless UE 101 exchanges hardware-trust data with hardware-trust circuitry 112 over wireless network slice 122 and signaling circuitry 111. Hardware-trust circuitry 112 verifies the hardware identification code embedded in UE 101 and returns a hardware-trust digital certificate to UE 101. If hardware-trust is verified for UE 101, then hardware-trust circuitry 112 exchanges handover signaling with distributed ledger circuitry 113. Responsive to the handover signaling and hardware-trust verification, distributed ledger circuitry 113 generates a slice template to implement the internet-access QoS level and the internet-access restriction for UE 101 in target wireless network slice 122. Distributed ledger circuitry 113 transfers the slice template to signaling circuitry 111 and records handover metadata in a blockchain format. Signaling circuitry 111 transfers the slice template to target wireless network slice 122. After the handover, UE 101 marks data packets for wireless network slice 122 per the handover signaling and slice template. Target wireless network slice 122 delivers the wireless internet-access service to wireless UE 101 using the internet-access QoS level and the internet-access restriction indicated by the slice template.

Advantageously, wireless network control system 110 efficiently and effectively directs UE handovers between wireless network slices 121-122. Moreover, network control system 110 enforces hardware-trust while porting the internet QoS and the internet restrictions across the home/visited network boundary.

Figure 2:
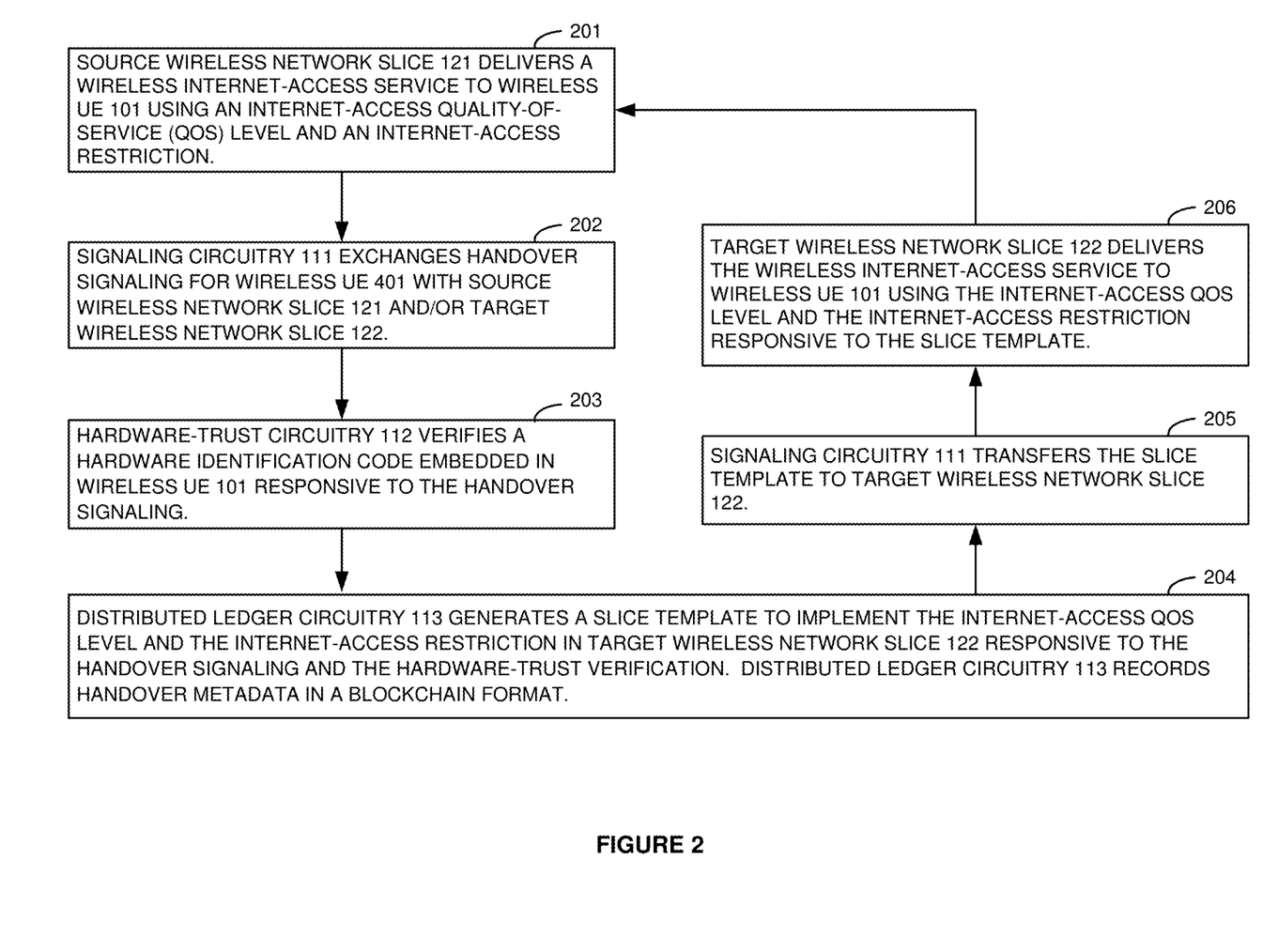
FIG. 2 illustrates the operation of the wireless communication system to facilitate the handover of the wireless UE from the source wireless network slice to the target wireless network slice.

FIG. 2 illustrates the operation of wireless communication system 100 to facilitate the handover of wireless UE 101 from source wireless network slice 121 to target wireless network slice 122. Source wireless network slice 111 delivers a wireless internet-access service to the wireless UE 101 using an internet-access QoS level and an internet-access restriction (201). Signaling circuitry 111 exchanges handover signaling for UE 101 with source wireless network slice 121 and/or wireless network slice 122. In response to handover signaling, hardware-trust circuitry 112 verifies the hardware identification code embedded in UE 101 (203). Responsive to the handover signaling and hardware-trust verification, distributed ledger circuitry 113 generates a slice template to implement the internet-access QoS level and the internet-access restriction for UE 101 in target wireless network slice 122 (204). Distributed ledger circuitry 113 records handover metadata in a blockchain format. Signaling circuitry 111 transfers the slice template to target wireless network slice 122 (205). Target wireless network slice 122 delivers the wireless internet-access service to wireless UE 101 using the internet-access QoS level and the internet-access restriction in response to the slice template.

Figure 3:
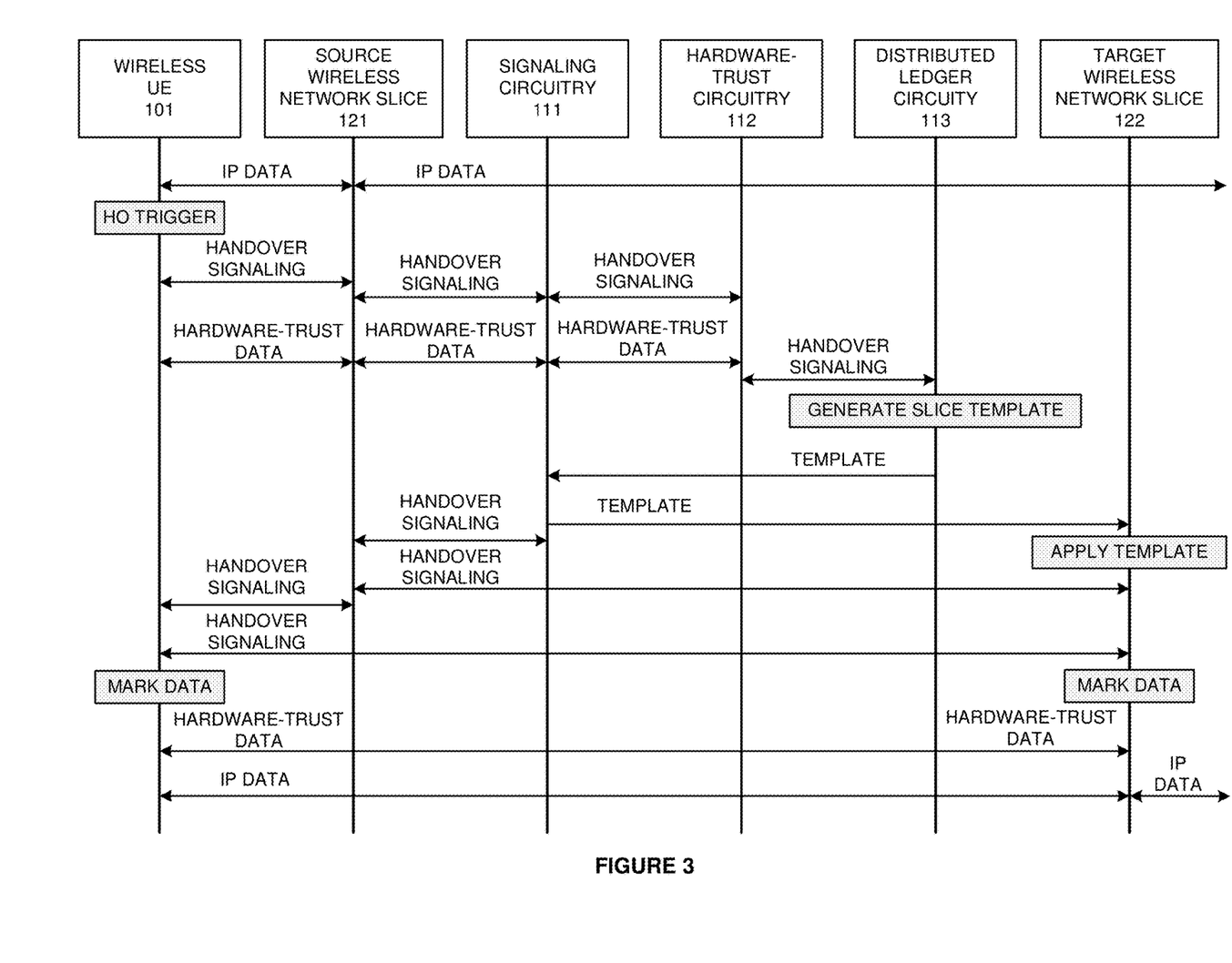
FIG. 3 illustrates an exemplary operation of the wireless communication system to facilitate the handover of the wireless UE from the source wireless network slice to the target wireless network slice.

FIG. 3 illustrates an exemplary operation of wireless communication system 100 to facilitate the handover of wireless UE 101 from source wireless network slice 121 to target wireless network slice 122. Initially, wireless UE 101 and source wireless network slice 111 exchange Internet Protocol (IP) data using a QoS level and access restriction. The QoS level specifies bit-rate and latency. The access restriction specifies content filter-criteria—perhaps for parental/employer control. Wireless UE 101 detects a handover trigger and exchanges handover signaling with source wireless network slice 121. Source wireless network slice 121 exchanges handover signaling with hardware-trust circuitry 112 over signaling circuitry 111.

In response to the handover signaling, wireless UE 101 and hardware-trust circuitry 112 exchange hardware-trust data over source wireless network slice 121 and signaling circuitry 111. Hardware-trust circuitry 112 verifies the hardware identification code embedded in UE 101 and transfers a hardware-trust digital certificate to UE 101. Since hardware-trust is verified for UE 101, hardware-trust circuitry 112 exchanges handover signaling with distributed ledger circuitry 113. Responsive to the handover signaling, distributed ledger circuitry 113 generates a slice template to implement the internet-access QoS level and the internet-access restriction for UE 101 in target wireless network slice 122. For example, source wireless network slice 121 may use a UE type for UE 101 that is indicated by the handover signaling, and ledger 113 may generate the slice template by translating the UE type into a pre-configured slice template for the UE type when visiting target wireless network slice 122. In this example, the template has a hardware-trust requirement and packet-marking instructions.

Distributed ledger circuitry 113 transfers the slice template to signaling circuitry 111 and records handover metadata in a blockchain format. Signaling circuitry 111 transfers the slice template to target wireless network slice 122. Signaling circuitry 111 exchanges handover signaling with source wireless network slice 121 to authorize the handover. Source wireless network slice 121 exchanges handover signaling with target wireless network slice 122 to initiate the authorized handover. Source wireless network slice 121 exchanges handover signaling with UE 101 to initiate the handover. UE 101 exchanges handover signaling with target wireless network slice 122 to perform the handover. After the handover, UE 101 marks data packets for wireless network slice 122 per the handover signaling and slice template. UE 101 transfers its hardware-trust certificate to target wireless network slice 122. Target wireless network slice 122 verifies the hardware-trust certificate for UE 101. If the hardware-trust certificate is verified, wireless UE 101 and target wireless network slice 122 exchange IP data using the QoS level and access restriction per the QoS marks in the IP packets and the slice template. The QoS level specifies bit-rate and latency. The access restriction specifies content filter-criteria like parental/employer controls.

Figure 4:
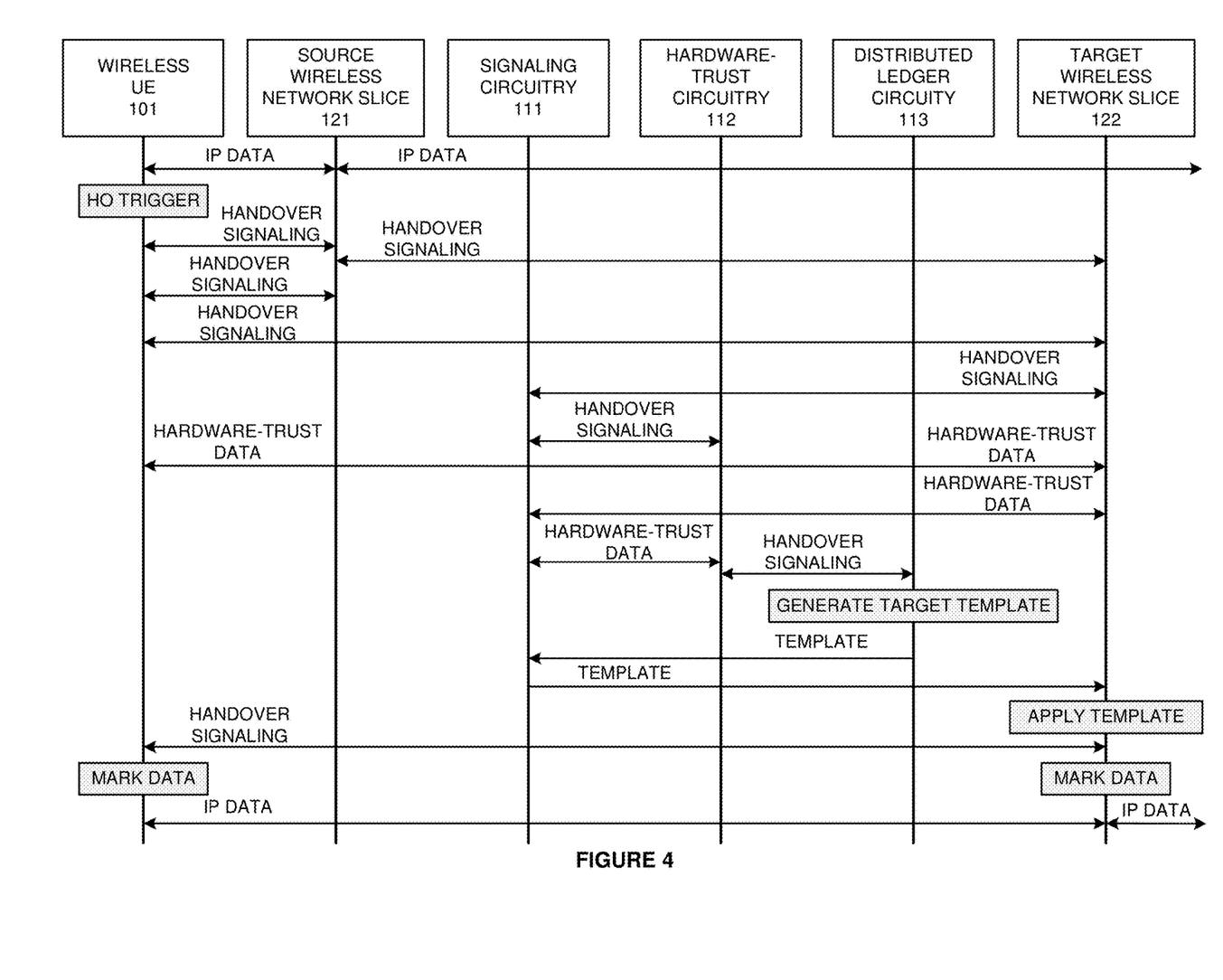
FIG. 4 illustrates another exemplary operation of the wireless communication system to facilitate the handover of the wireless UE from the source wireless network slice to the target wireless network slice.

FIG. 4 illustrates another exemplary operation of wireless communication system 101 to facilitate the handover of wireless UE 101 from source wireless network slice 121 to target wireless network slice 122. Initially, wireless UE 101 and source wireless network slice 111 exchange IP data using a QoS level and access restriction. The QoS level specifies bit-rate and latency. The access restriction specifies content filter-criteria. Wireless UE 101 detects a handover trigger and exchanges handover signaling with source wireless network slice 121. Source wireless network slice 121 exchanges handover signaling with target wireless network slice 122 to initiate the handover. Source wireless network slice 121 exchanges handover signaling with UE 101 to initiate the handover. UE 101 exchanges handover signaling with target wireless network slice 122 to perform the handover.

In response to the handover signaling, target wireless network slice 122 exchanges handover signaling with for UE 101 with hardware-trust circuitry 122 over signaling circuitry 111. In response to the handover signaling, wireless UE 101 exchanges hardware-trust data with hardware-trust circuitry 112 over target wireless network slice 122 and signaling circuitry 111. Hardware-trust circuitry 112 verifies the hardware identification code embedded in UE 101 and returns a hardware-trust digital certificate to UE 101. If hardware-trust is verified for UE 101, then hardware-trust circuitry 112 exchanges handover signaling with distributed ledger circuitry 113. Responsive to the handover signaling and hardware-trust verification, distributed ledger circuitry 113 generates a slice template to implement the internet-access QoS level and the internet-access restriction for UE 101 in target wireless network slice 122.

Distributed ledger circuitry 113 transfers the slice template to signaling circuitry 111 and records handover metadata in a blockchain format. Signaling circuitry 111 transfers the slice template to target wireless network slice 112. Target wireless network slice 122 and wireless UE 101 exchange handover signaling to finalize the handover. UE 101 may transfer its hardware-trust certificate to target wireless network slice 122 for additional verification. Wireless UE 101 and target wireless network slice 122 exchange IP data using the QoS level and access restriction per the QoS marks in the IP packets and the slice template. The QoS level specifies bit-rate and latency. The access restriction specifies content filter-criteria.

In some examples, a user/machine operates UE 101 to execute a user application. After the standard handover from wireless slice 121 to target network slice 122 is complete, then the user application transfers the handover signaling to hardware-trust circuitry 112 over target network slice 122 and signaling circuitry 112. The operation is then similar to that described herein.

Figure 5:
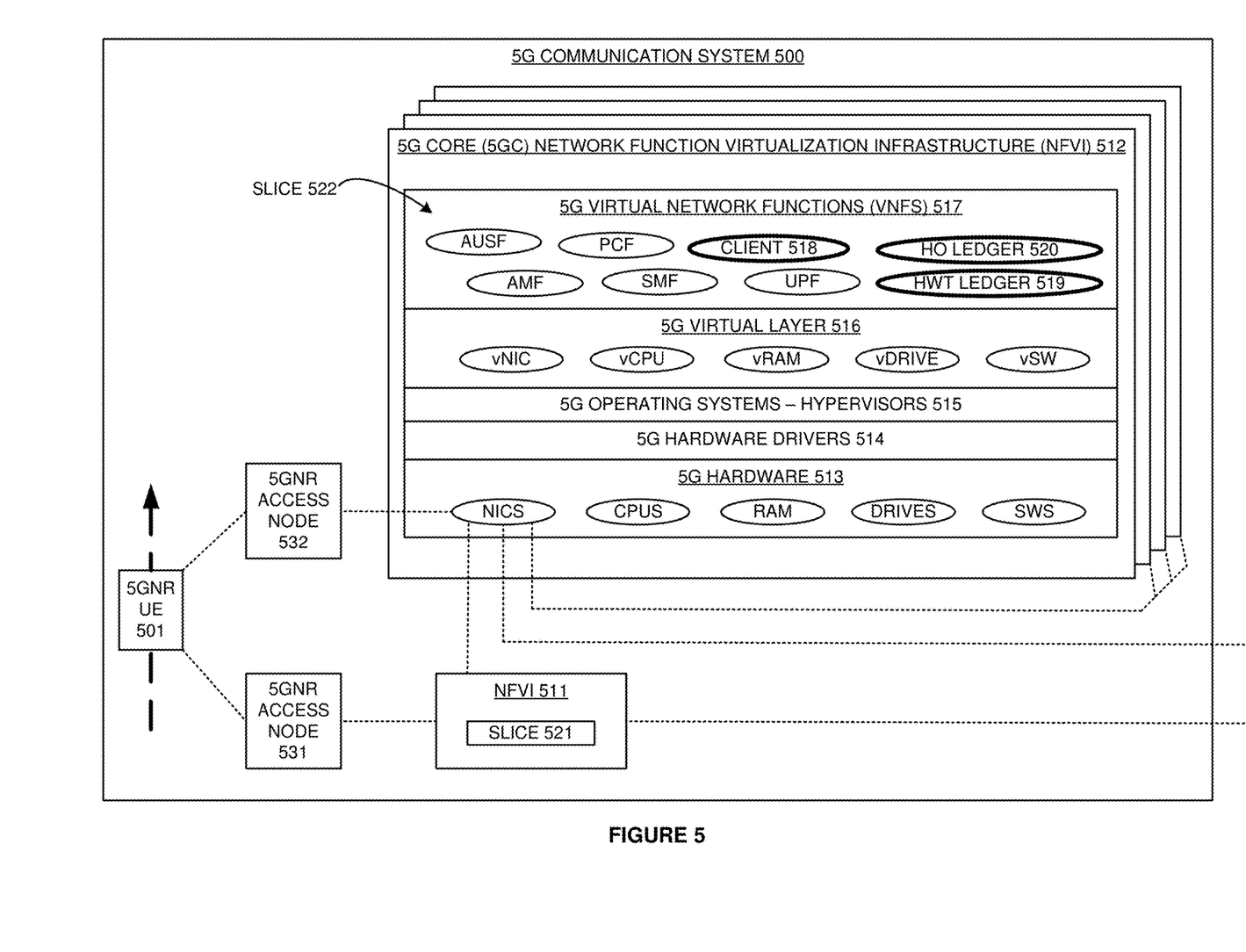
FIG. 5 illustrates a Fifth Generation (5G) communication system comprising 5G Network Function Virtualization Infrastructures (NFVIs) to facilitate the handover of a 5G New Radio (5GNR) UE from a source wireless network slice to a target wireless network slice.

FIG. 5 illustrates Fifth Generation (5G) communication system 500 comprising 5G Network Function Virtualization Infrastructures (NFVIs) 511-512 to facilitate the handover of 5G New Radio (5GNR) UE 501 from source wireless network slice 521 to target wireless network slice 522. 5G communication system 500 is an example of wireless communication system 100, although system 100 may differ. 5G communication system 500 comprises 5GNR UE 501, 5GNR access nodes 531-532, and 5GC NFVI s 511-512. 5GNR UE 501 and 5GNR access nodes 531-532 are coupled over wireless 5GNR links. 5GNR access nodes 531-532 and 5GC NFVI s 511-512 are coupled over network links.

5GC NFVI 512 comprises 5G hardware 513, 5G hardware drivers 514, 5G operating systems and hypervisors 515, 5G virtual layer 516, and 5G Virtual Network Functions (VNFs) 517. 5G hardware 513 comprises Network Interface Cards (NICs), CPUs, RAM, flash/disk drives, and data switches (SWS). 5G virtual layer 516 comprises virtual NICs (vNIC), virtual CPUs (vCPU), virtual RAM (vRAM), virtual Drive (vDRIVE), and virtual Switches (vSW). 5GC NFVI 512 is distributed across geographically-diverse data centers that are each configured in a similar manner to the top NFVI that is depicted on FIG. 5. The NICs of the geographically-diverse data centers data centers are coupled to each other over network links. The NICs of 5GC NFVI 512 are also linked to 5GNR access nodes 531-532, NFVI 511, and other systems.

5G VNFs 517 comprise Authentication and Security Functions (AUSF), Policy Control Functions (PCF), Access and Mobility Management Functions (AMF), Session Management Functions (SMF), User Plane Functions (UPF), ledger client 518, hardware-trust (HWT) ledger 519, and handover (HO) ledger 520. Other 5G network functions are typically present but are omitted for clarity. 5G hardware 513 executes 5G hardware drivers 514, 5G operating systems and hypervisors 514, 5G virtual layer 515, and 5G VNFs 517 to serve 5GNR UE 501 over 5GNR access node 532.

In this example, wireless network slice 522 comprises an AUSF, AMF, PCF, SMF, UPF, and supporting circuitry (but not client 518 or ledgers 519-520). 5G NFVI 512 implements wireless network slice 522 based on instructions like Service Descriptors (SDs) and Forwarding Graphs (FGs). The wireless network slice instructions indicate 5G VNFs 517 and their interconnections. 5G VNFs 517 support services for UE 501. For example, a UPF may exchange user data packets for 5GNR UE 501 between 5GNR access node 532 and the internet. The SMF controls the UPF per policies in the PCF. Wireless network slice 521 is similar. Ledger client 518 serves as a signaling interface between ledgers 519-520 and slices 521-522.

Hardware-trust ledger 519 maintains a hardware-trust database for 5GNR UEs like UE 501. The hardware-trust database indicates hardware-trust codes and hash algorithms for the wireless UEs and possibly other devices. Hardware-trust ledger 519 receives a hardware-trust request from UE 501 and returns a random number. UE 501 hashes the random number with its hardware-trust ID and returns the hash. Hardware-trust ledger 519 receives a hash and hashes the same hardware-trust code and random number to match the hash from UE 501 and validate hardware-trust. Hardware-trust ledger 519 transfers a hardware-trust certificate to UE 501. The hardware-trust certificate indicates hardware-trust for UE 501 and is signed with the private key for the hardware-trust ledger 519. The hardware-trust certificate typically has a very short time-to-live. Other UEs and devices may obtain hardware-trust certificates in a similar manner.

Handover ledger 519 maintains a slice-translation database for 5GNR UEs like UE 501. The slice-translation database indicates slice IDs, slice templates, and slice translations between slices. For example, the slice-translation database may indicate that slices 521-522 may handover UEs and indicate their slice templates. Handover ledger 519 receives a template request for UE 501 from hardware-trust ledger 519, slice 521, and/or slice 522. Handover ledger 519 translates the slice ID for slice 521 and UE type for 5GNR UE 501 into the slice ID for slice 522. Handover ledger 519 transfers the slice template for wireless slice 522 to NFVI 512. In particular, client 518 in NFVI 512 configures VNFs 517 in slice 522 like the UPF and SMF to serve UE 501 per the QoS and restrictions in the slice template.

Source wireless network slice 521 delivers a mobile internet-access service to wireless UE 501 using a QoS level and internet-access restrictions. The QoS level specifies bit-rate, latency, and packet-marking. The access restrictions specify content filter-criteria, hardware-trust requirements, geographic/time service boundaries, and the like. Wireless UE 501 detects a handover trigger like low signal strength, user application, time-of-day, geographic location, or some other metric. Wireless UE 101 exchanges handover signaling with 5GNR access node 531 to initiate the handover, and 5GNR access node 531 exchanges handover signaling with an AMF in source wireless network slice 521. The handover signaling indicates information like network ID, slice ID, UE ID, UE type, and typically other information.

The AMF in source wireless network slice 521 exchanges handover signaling with an AMF in target wireless network slice 522. The AMF in source wireless network slice 521 exchanges handover signaling with 5GNR access node 531, and node 531 exchanges handover signaling with UE 501. The AMF in target wireless network slice 522 exchanges handover signaling with 5GNR access node 532, and node 532 exchanges handover signaling with UE 501.

In response to the handover, wireless UE 501 exchanges hardware-trust data with hardware-trust ledger 519 over wireless network slice 522 and ledger client 518. Hardware-trust ledger 519 verifies the hardware identification code embedded in UE 501. When hardware-trust is verified for UE 501, hardware-trust ledger 519 exchanges handover signaling with handover ledger 520.

Responsive to the handover signaling, handover ledger 519 generates a slice template to implement the internet-access QoS level and the internet-access restriction for UE 501 in target wireless network slice 522. In some examples, the slice template indicates networking parameters (address, access code, protocol version, and the like) for a policy interface (Gx), charging interface (Gy/Gz), internet interface (SGi), and Gateway Control-Plane (GW-C) interface. Handover ledger 520 transfers the slice template to ledger client 518 and records handover metadata in a distributed ledger block. Ledger client 518 transfers the slice template to the AMF in target wireless network slice 522. The AMF configures the AUSF, SMF, PCF, UPF, and other VNFs 517 to serve UE 501 per the slice template. The AUSF authorizes services for UE 501 per the slice template. The SMF manages sessions for UE 501 per the slice template. The PCF applies policies for UE 501 per the slice template. The UPF handles IP packets for UE 501 per the slice template and packet marks.

After the handover, 5GNR UE 501 and 5GNR access node 532 exchange marked IP packets per the slice template. 5GNR access node 532 and a UPF in target slice 522 exchange the marked IP packets per the slice template. The UPF and external systems typically exchange the IP packets. The UPF applies internet-restrictions like data content filtering. The AMF applies internet-restrictions like geographic and time boundaries for data services like internet access.

Figure 6:
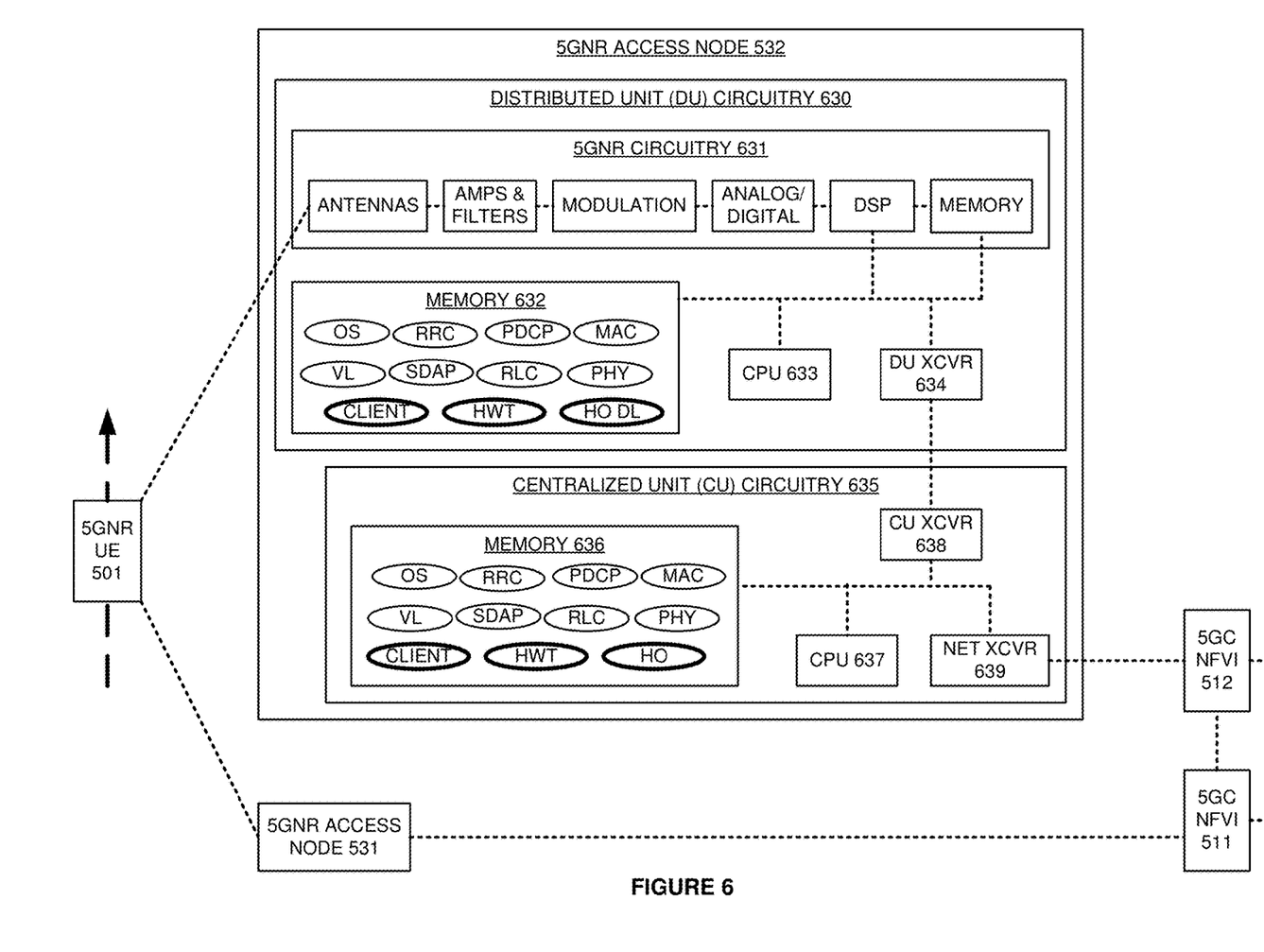
FIG. 6 illustrates a 5GNR access node in the 5G communication system to facilitate the handover of the 5GNR UE from the source wireless network slice to the target wireless network slice.

FIG. 6 illustrates 5GNR access node 532 in 5G communication system 500 to facilitate the handover of 5GNR UE 501 from source wireless network slice 521 to target wireless network slice 522. Wireless access node 531 is similar to wireless access node 532. Wireless access node 532 comprises Distributed Unit (DU) circuitry 630 and Centralized Unit (CU) circuitry 635. DU circuitry 630 comprises 5GNR circuitry 631, memory 632, Central Processing Units (CPU) 633, and DU XCVR 634 that are coupled over bus circuitry. 5GNR circuitry 631 comprises antennas, amplifiers (AMPS), filters, modulation, analog-to-digital interfaces, Digital Signal Processors (DSP), and memory that are coupled over bus circuitry. CU circuitry 635 comprises memory 636, CPU 637, CU XCVR 638, and network XCVR 639 that are coupled over bus circuitry. UE 501 is wirelessly coupled to the antennas in 5GNR circuitry 631 over wireless 5GNR links. DU XCVR 634 is coupled to CU XCVR 638 over fronthaul network links. Network XCVR 639 is coupled to NFVI 512 over backhaul network links.

In DU circuitry 630, memory 632 stores operating system (OS), virtual layer (VL), Physical Layer (PHY), Media Access Control (MAC), Radio Link Control (RLC), Packet Data Convergence Protocol (PDCP), Radio Resource Control (RRC), and Service Data Adaptation Protocol (SDAP). In CU circuitry 635, the memories store operating system, virtual layer, PHY, MAC, RLC, PDCP, RRC, and SDAP. The virtual layer comprises hypervisor modules, virtual switches, virtual CPUs, and/or the like. In some examples, DU circuitry 630 also hosts a ledger client, hardware-trust ledger, and handover ledger.

CPU 637 in CU circuitry 635 executes some or all of the network applications (PHY, MAC, RLC, PDCP, RRC, and SDAP) to drive the exchange of user data and network signaling data between NFVI 512 and DU circuitry 630. CPU 633 in DU circuitry 631 executes some or all of the network applications to drive the transfer of user data and network signaling between CU circuitry 635 and UE 501. The functionality split of the network applications between DU circuitry 631 and CU circuitry 635 may vary. In some examples, CU circuitry 635 also hosts a ledger client, hardware-trust ledger, and handover ledger.

The RRCs in circuitry 631/635 exchange handover signaling like RRC and N2 with UEs and AMFs. The RRCs exchange N2/N1 signaling with the AMFs in NFVI 512. The RRC exchanges RRC/N1 signaling with UE 501. The RRCs process Uplink (UL) RRC signaling and Downlink (DL) N2 signaling to generate new DL RRC signaling and new UL N2 signaling. The SDAPs in circuitry 631/635 exchange N3 data with UPFs in NFVI 512. The SDAPs exchange SDAP data with an SDAP in UE 501. The SDAPs interwork between the N3 data and the SDAP data.

The RRCs exchange the RRC/N1 signaling with the PDCPs in Service Data Units (SDUs). The SDAPs exchanges the SDAP data with the PDCPs in SDUs. The PDCPs map between the SDUs and Protocol Data Units (PDUs). The PDCPs exchange the PDUs with the RLCs. The RLCs map between the PDUs and MAC logical channels. The RLCs exchange the RRC/N1 and SDAP data with the MACs over the MAC logical channels. The MACs map between the MAC logical channels and MAC transport channels. The MACs exchange the RRC/N1 signaling and SDAP data with the PHYs over the MAC transport channels. The PHYs map between the MAC transport channels and PHY transport channels. The PHYs exchange the RRC/N1 signaling and SDAP data with the PHY in UE 501 over PHY transport channels in the 5GNR wireless link.

In 5GNR circuitry 631, the antennas receive wireless 5GNR signals from UE 501 that transport the UL RRC/N1 signaling and SDAP data. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL 5GNR symbols from the UL digital signals. In DU circuitry 631 and/or CU circuitry 635, CPUs 633/637 execute the network applications to process the UL 5GNR symbols and recover the UL RRC/N1 signaling and SDAP data. In DU circuitry 631 and/or CU circuitry 635, CPUs 633/637 execute the network applications to generate new UL N2/N1 signaling and UL N3 data. In CU circuitry 635, network XCVR 639 transfers the new UL N2/N1 signaling and N3 data to NFVI 512.

In CU circuitry 635, network XCVR 639 receives DL N2/N1 signaling and N3 data from NFVI 512 and transfers the signaling and data to memory. In DU/CU circuitry 630/635, CPU 633/636 execute the network applications to generate new DL RRC/N1 signaling and SDAP data. In circuitry 630/635, CPU 633/637 execute the network applications to process the new DL RRC/N1 signaling and SDAP data to generate DL 5GNR symbols that carry the DL RRC/N1 signaling and SDAP data. In DU circuitry 630, the DSP process the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals over the wireless 5GNR link that transport the DL RRC/N1 signaling and SDAP data to UE 501.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In some examples, CU circuitry 635 hosts at least some of the ledger client, hardware-trust ledger, and handover ledger. CPU 637 executes the operating system, ledger client, hardware-trust ledger, and handover ledger to operate as described herein for network control system 110. In some examples, DU circuitry 631 hosts at least some of the ledger client, hardware-trust ledger, and handover ledger. CPU 633 executes the operating system, ledger client, hardware-trust ledger, and handover ledger to operate as described herein for network control system 110. The CUs and/or the DUs that serve the source and target wireless network slices 521-522 may host endorser, orderer, and peer nodes for the hardware-trust ledger and/or the handover ledger. For example, a CU for a home network that hosts source slice 521 and a CU for a visited network that hosts target slice 522 may also host peer nodes in the hardware-trust ledger and/or the handover ledger.

Figure 7:
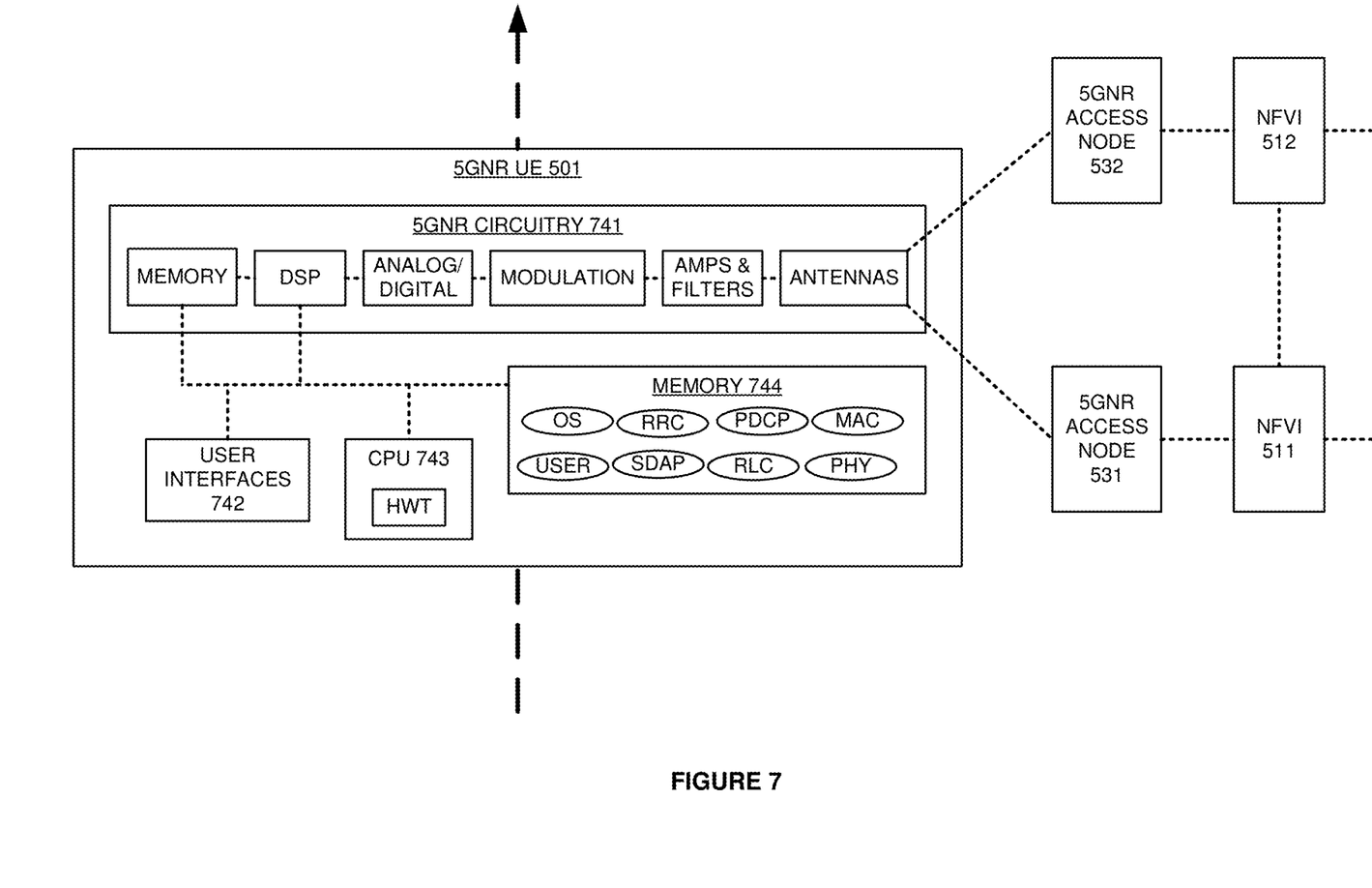
FIG. 7 illustrates the 5GNR UE in the 5G communication system that hands-over from the source wireless network slice to the target wireless network slice.

FIG. 7 illustrates 5GNR UE 501 in 5G communication system 500 that hands-over from source wireless network slice 521 to target wireless network slice 522. UE 501 is an example of UE 101, although UE 101 may differ. 5GNR UE 501 comprises 5GNR circuitry 741, user interfaces 742, CPU 743, and memory 744 which are interconnected over bus circuitry. CPU 743 has a permanently embedded, read-only, hardware trust ID (HWT). 5GNR circuitry 741 comprises antennas, amplifiers, filters, modulation, analog-to-digital interfaces, DSP, and memory that are coupled over bus circuitry. The antennas in UE 501 are coupled to wireless access nodes 531-532 over wireless 5GNR links. User interfaces 742 comprise graphic displays, machine controllers, sensors, cameras, transceivers, and/or some other user components. Memory 744 stores an operating system, user applications, and network applications. The network applications comprise PHY, MAC, RLC, PDCP, RRC, and SDAP. CPU 743 executes the operating systems, user applications, and network applications to exchange RRC/N1 signaling and SDAP data with 5GNR access nodes 531-532 over 5GNR circuitry 741.

The RRC exchanges user signaling with the user applications. The RRC processes the user signaling and DL RRC/N1 signaling to generate DL user signaling and UL RRC/N1 signaling. The SDAP exchanges user data with the user applications. The SDAP marks packets per the slice template. The SDAP processes UL user data to generate uplink SDAP data and processes DL SDAP data to generate DL user data. The RRC exchanges the RRC/N1 signaling with the PDCP in SDUs. The SDAP exchanges the SDAP data with the PDCP in SDUs. The PDCP maps between the SDUs and PDUs. The PDCP exchanges the PDUs with the RLC. The RLC maps between the PDUs and MAC logical channels. The RLC exchanges the RRC/N1 and SDAP data with the MAC over the MAC logical channels. The MAC maps between the MAC logical channels and MAC transport channels. The MAC exchanges the RRC/N1 signaling and SDAP data with the PHY over the MAC transport channels. The PHY maps between the MAC transport channels and PHY transport channels. The PHY exchanges the RRC/N1 signaling and SDAP data with the PHYs in 5GNR access nodes 531-532 over PHY transport channels in the 5GNR links.

In 5GNR circuitry 741, the antennas receive wireless signals from 5GNR access nodes 531-532 that transport DL RRC/N1 signaling and SDAP data. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSP. The DSP recovers DL symbols from the DL digital signals. CPU 743 executes the network applications to process the DL 5GNR symbols and recover the DL RRC/N1 signaling and SDAP data. CPU 743 executes the network applications to process the DL RRC/N1 signaling and SDAP data to generate DL user data and signaling for the user applications.

CPU 743 executes the network applications to process UL user data and signaling to generate UL RRC/N1 signaling and SDAP data. CPU 743 executes the network applications to process the UL RRC/N1 signaling and SDAP data to generate corresponding UL 5GNR symbols. The DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequencies. The amplifiers boost the modulated UL signals for the filters which attenuate unwanted out-of-band energy. The filters transfer the filtered UL signals through duplexers to the antennas. The electrical UL signals drive the antennas to emit corresponding wireless signals that transport the UL RRC/N1 signaling and SDAP data to 5GNR access nodes 531-532 over the wireless 5GNR links.

The PHY detects signal strength from 5GNR access nodes 531-532. The RRC detects a handover triggers like significantly better signal strength from 5GNR access node 532 that access node 531. The RRC exchanges handover signaling RRC/N1 with the RRCs in wireless access nodes 531-532. The handover signaling indicates network ID, slice ID, UE ID, UE type, and possibly a hardware-trust certificate.

Figure 8:
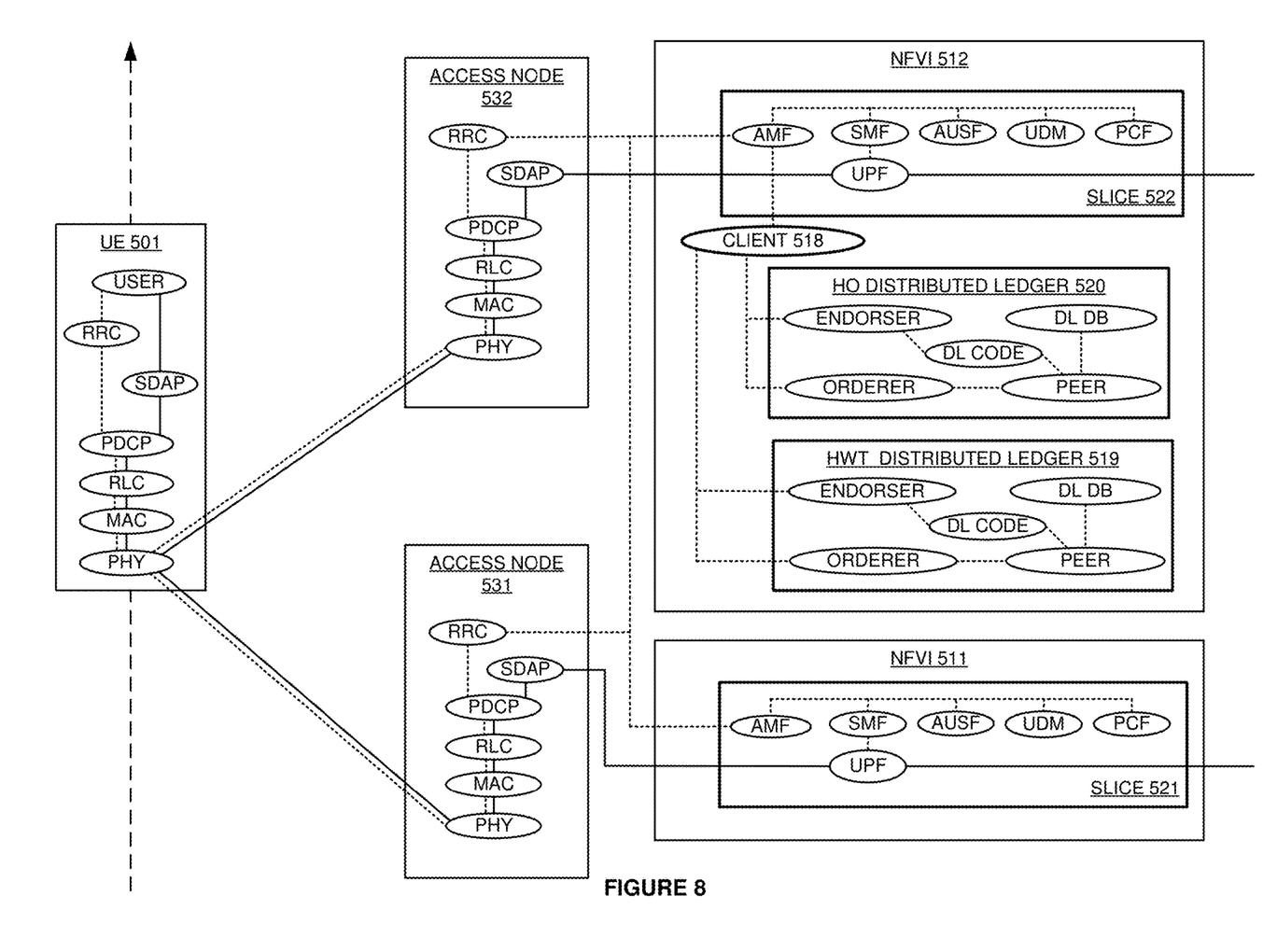
FIG. 8 illustrates the operation of the 5G communication system comprising the 5G NFVIs to facilitate the handover of the 5GNR UE from the source wireless network slice to the target wireless network slice.

FIG. 8 illustrates the operation of 5G communication system 500 comprising 5G NFVIs 511-512 to facilitate the handover of 5GNR UE 501 from source wireless network slice 521 to the target wireless network slice 522. In UE 501, the user applications (USER) exchange signaling with the RRC and SDAP. The RRC in UE 501 exchanges RRC/N1 signaling with the RRC in access node 531 over their PDCP, RLC, MAC, and PHY. The RRC in access node 531 exchanges N2/N1 signaling with the AMF in slice 521 of NFVI 511. In slice 521, the AMF, AUSF, and UDM interact to authenticate UE 501 and authorize a wireless internet-access service for UE 501. The AMF, SMF, and PCF interact to select QoS, restrictions, and other session parameters for UE 501. The SMF directs the UPF to serve UE 501 over access node 531 per the QoS, restrictions, and other parameters.

In response to the signaling, the user application and the SDAP in UE 501 exchange user data. The SDAP in UE 501 exchanges corresponding SDAP data with the SDAP in access node 531 over their PDCP, RLC, MAC, and PHY. The SDAP in access node 531 exchanges corresponding N3 data with the UPF in slice 521 of NFVI 511. The UPF in slice 521 exchanges corresponding SGi data with an internet router. In slice 521, the UPF applies the selected QoS and restrictions. For example, UPF may use a high bit-rate and ultra-low latency to deliver a premium internet service to UE 501. The UPF may apply restrictions like content filtering, malware protection, hardware-trust verification, and the like.

In UE 501, the PHY detects the signal strength from access nodes 531-532 and transfer Received Signal Strength Indicators (RSSIs) to the RRC. When the RSSI for access node 531 is fading, and the RSSI for access node 532 is stronger by three decibels or so, then the RRC in UE 501 initiates a handover from access node 531 to access node 532. To initiate the handover, the RRC in UE 501 and the RRC in access node 531 exchange RRC/N1 signaling, and the RRC in access node 531 and the AMF in slice 511 exchange N2/N1 signaling.

Because the handover is between slices 521-522, the AMF in slice 521 exchanges handover signaling with the AMF in slice 522 of NFVI 512. The handover signaling identifies UE 504, access node 532, and slice 531. The AMF in slice 521 of NFVI 511 responsively exchanges N2/N1 signaling with the RRC access node 531 to handover UE 501, and the AMF in slice 522 of NFVI 512 responsively exchanges N2/N1 signaling with the RRC in access node 532 to accept the handover. The RRC in access node 531 and the RRC in UE 501 exchange RRC/N1 signaling, and then the RRC in UE 501 and the RRC in access node 532 exchange RRC/N1 signaling to perform the handover. The RRC in access node 532 and the AMF in slice 522 of NFVI 512 exchange N2/N1 signaling to confirm the handover.

In response to the handover, the AMF in slice 522 exchanges handover signaling with client 518. In response to the handover signaling, client 518 transfer a random number to the RRC in UE 501 over the AMF and access node 532. In UE 501, the RRC transfers the random number to the operating system, and the operating system hashes the random number with a hardware-trust ID that is permanently embedded within UE circuitry. The RRC transfers the hash to client 518 over access node 532 and the AMF. Client 519 transfers the hash and random number to an endorser node in hardware-trust ledger 519.

In hardware-trust ledger 519, the endorser node executes DL code to generate a code result (hardware-trust for UE 501). The endorser node checks the DL code result against an endorsement rule set. The endorser node transfers a transaction endorsement back to client 518. Client 518 transfers the endorsed transaction to an orderer node in ledger 519. The orderer node transfers the endorsed transaction to the appropriate peer nodes. The peer nodes independently execute their DL code to generate a result (hardware-trust for UE 501). The peer nodes share their DL code result to form a consensus for the correct result. After consensus, the peer nodes store the transaction data in their DL databases using a blockchain format. The blocks include transaction data like UE ID, access nodes 531-532, slices 521-522, and hardware-trust verification. The blocks include a hash of the previous block and other blockchain data.

In response to the hardware-trust verification, client 518 transfers handover signaling for UE 501 to handover ledger 520. In handover ledger 520, the endorser node executes DL code to generate a code result (slice template for UE 501). In some examples, the DL code maintains a data structure to translate the serving slice ID for slice 521 into a template ID for slice 522. The endorser node checks the DL code result against an endorsement rule set. The endorser node transfers a transaction endorsement back to client 518. Client 518 transfers the endorsed transaction to an orderer node in ledger 520. The orderer node transfers the endorsed transaction to the appropriate peer nodes. The peer nodes independently execute their DL code to generate a result (slice template for UE 501). The peer nodes share their DL code result to form a consensus for the correct result. After consensus, the peer nodes store the transaction data in their DL databases using a blockchain format. The blocks include transaction data like UE ID, slice ID, template ID. The blocks include a hash of the previous block and other blockchain data. Based on the template ID or some other peer instruction, client 518 transfers the slice template for UE 501 to the AMF in slice 522.

The slice template for UE 501 indicates QoS, restrictions, hardware-trust, and other parameters. In slice 522, the AMF, AUSF, and UDM interact to authenticate UE 501 and authorize a wireless internet-access service for UE 501 based on the slice template. The AMF, SMF, and PCF interact to select QoS, restrictions, and other session parameters for UE 501 based on the slice template. The SMF directs the UPF to serve UE 501 over access node 531 per the slice template.

The user application and the SDAP in UE 501 exchange user data. A UPF in slice 522 and the internet exchange user data. The SDAP and UPF mark the user data per the slice template. The SDAP in UE 501 exchanges corresponding SDAP data with the SDAP in access node 532 over their PDCP, RLC, MAC, and PHY. The SDAP in access node 532 exchanges corresponding N3 data with the UPF in slice 522 of NFVI 512. The UPF in slice 522 exchanges corresponding user data with an internet router. In slice 522, the UPF applies the selected QoS and restrictions per the packet marks and slice template. For example, the UPF may use the high bit-rate and ultra-low latency to deliver the premium internet service to UE 501. The UPF may apply restrictions like content filtering, malware protection, hardware-trust verification, and the like.

The wireless data network circuitry described above comprises computer hardware and software that form special-purpose network circuitry to handover wireless UEs between wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover wireless UEs between wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method of operating a wireless network control system to facilitate a handover of wireless User Equipment (UE) from a source wireless network slice to a target wireless network slice, the method comprising:
   signaling circuitry exchanging handover signaling for the wireless UE with at least one of the source wireless network slice and the target wireless network slice, wherein the source wireless network slice delivers a wireless internet-access service to the wireless UE using an internet-access Quality-of-Service (QoS) level and an internet-access restriction;
   responsive to the handover signaling, hardware-trust circuitry verifying a hardware identification code embedded in the UE;
   responsive to the handover signaling and the hardware-trust verification, distributed ledger circuitry generating a slice template to implement the internet-access QoS level and the internet-access restriction in the target wireless network slice and recording handover metadata in a blockchain format; and
   the signaling circuitry transferring the slice template to the target wireless network slice, wherein the target wireless network slice delivers the wireless internet-access service to the wireless UE using the internet-access QoS level and the internet-access restriction responsive to the slice template.

2. The method of claim 1 wherein the source wireless network slice is in a home network for the wireless UE and the target wireless network slice is in a visited network for the wireless UE.

3. The method of claim 1 wherein:
   the source wireless network slice has a source slice Identifier (ID);
   the handover signaling indicates the source slice ID;
   the distributed ledger circuitry generating the slice template comprises translating the source slice ID into a target slice ID associated with the slice template.

4. The method of claim 1 wherein the internet-access QoS comprises a bit-rate and a latency, and the internet-access restriction comprises filter criteria for a data content filter.

5. The method of claim 1 wherein the slice template indicates a hardware-trust restriction for the wireless UE and further comprising the signaling circuitry transferring a hardware-trust certificate to the wireless UE responsive to the hardware-trust circuitry verifying the hardware identification code embedded in the UE and wherein the target wireless network slice receives and verifies the hardware-trust certificate from the wireless UE before delivering the wireless internet-access service to the wireless UE responsive to the slice template.

6. The method of claim 1 wherein the slice template indicates a packet mark and wherein the wireless UE marks data packets with the packet mark to obtain the internet-access QoS from the target wireless network slice.

7. The method of claim 1 wherein the slice template indicates User Plane Function (UPF) parameters for at least one of a policy interface (Gx), charging interface (Gy/Gz), internet interface (SGi), and Gateway Control-Plane (GW-C) interface.

8. The method of claim 1 wherein at least some of the wireless network control system comprises one or more Virtual Network Functions (VNFs) residing in Network Function Virtualization Infrastructures (NFVIs).

9. The method of claim 1 wherein at least some of the wireless network control system resides in Centralized Unit (CU) circuitry in a Fifth Generation New Radio (5G NR) access node.

10. The method of claim 1 wherein at least some of the wireless network control system resides in Distributed Unit (DU) circuitry in a Fifth Generation New Radio (5G NR) access node.

11. A wireless network control system to facilitate a handover of wireless User Equipment (UE) from a source wireless network slice to a target wireless network slice, the wireless network control system comprising:
   signaling circuitry configured to exchange handover signaling for the wireless UE with at least one of the source wireless network slice and the target wireless network slice, wherein the source wireless network slice delivers a wireless internet-access service to the wireless UE using an internet-access Quality-of-Service (QoS) level and an internet-access restriction;
   hardware-trust circuitry configured to verify a hardware identification code embedded in the UE responsive to the handover signaling;
   distributed ledger circuitry configured to generate a slice template to implement the internet-access QoS level and the internet-access restriction in the target wireless network slice and record handover metadata in a blockchain format responsive to the handover signaling and the hardware-trust verification; and
   the signaling circuitry configured to transfer the slice template to the target wireless network slice, wherein the target wireless network slice delivers the wireless internet-access service to the wireless UE using the internet-access QoS level and the internet-access restriction responsive to the slice template.

12. The wireless network control system of claim 11 wherein the source wireless network slice is in a home network for the wireless UE and the target wireless network slice is in a visited network for the wireless UE.

13. The wireless network control system of claim 11 wherein:
   the source wireless network slice has a source slice Identifier (ID);
   the handover signaling indicates the source slice ID;
   the distributed ledger circuitry is configured to generate the slice template by translating the source slice ID into a target slice ID associated with the slice template.

14. The wireless network control system of claim 11 wherein the internet-access QoS comprises a bit-rate and a latency, and the internet-access restriction comprises filter criteria for a data content filter.

15. The wireless network control system of claim 11 wherein the slice template indicates a hardware-trust restriction for the wireless UE and further comprising the signaling circuitry configured to transfer a hardware-trust certificate to the wireless UE responsive to the hardware-trust circuitry verifying the hardware identification code embedded in the UE and wherein the target wireless network slice receives and verifies the hardware-trust certificate from the wireless UE before delivering the wireless internet-access service to the wireless UE responsive to the slice template.

16. The wireless network control system of claim 11 wherein the slice template indicates a packet mark and wherein the wireless UE marks data packets with the packet mark to obtain the internet-access QoS from the target wireless network slice.

17. The wireless network control system of claim 11 wherein the slice template indicates User Plane Function (UPF) parameters for at least one of a policy interface (Gx), charging interface (Gy/Gz), internet interface (SGi), and Gateway Control-Plane (GW-C) interface.

18. The wireless network control system of claim 11 wherein at least some of the wireless network control system comprises one or more Virtual Network Functions (VNFs) residing in Network Function Virtualization Infrastructures (NFVIs).

19. The wireless network control system of claim 11 wherein at least some of the wireless network control system resides in Centralized Unit (CU) circuitry in a Fifth Generation New Radio (5G NR) access node.

20. The wireless network control system of claim 11 wherein at least some of the wireless network control system resides in Distributed Unit (DU) circuitry in a Fifth Generation New Radio (5G NR) access node.

* * * * *